US007089387B2

United States Patent
Ganfield et al.

(10) Patent No.: US 7,089,387 B2
(45) Date of Patent: Aug. 8, 2006

(54) METHODS AND APPARATUS FOR MAINTAINING COHERENCY IN A MULTI-PROCESSOR SYSTEM

(75) Inventors: Paul A. Ganfield, Rochester, MN (US); Kerry C. Imming, Rochester, MN (US); John D. Irish, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 396 days.

(21) Appl. No.: 10/645,742

(22) Filed: Aug. 21, 2003

(65) Prior Publication Data

US 2005/0044328 A1    Feb. 24, 2005

(51) Int. Cl.
*G06F 12/14*    (2006.01)

(52) U.S. Cl. ..................................................... 711/163
(58) Field of Classification Search ................. 711/163
See application file for complete search history.

(56) References Cited

U.S. PATENT DOCUMENTS 5,404,482 A    4/1995 Stamm et al.

*Primary Examiner*—Kevin L. Ellis
(74) *Attorney, Agent, or Firm*—Dugan & Dugan

(57) ABSTRACT

In a first aspect, a method for maintaining control structure coherency is provided. The method includes the steps of (1) writing a pointer to a control structure in a hardware update list while one or more portions of the control structure are accessed by hardware during a hardware update operation; and (2) delaying a software access to one or more portions of the control structure during a software update operation while the pointer to the control structure is on the hardware update list. Numerous other aspects are provided.

29 Claims, 3 Drawing Sheets

METHODS AND APPARATUS FOR MAINTAINING COHERENCY IN A MULTI-PROCESSOR SYSTEM

FIELD OF THE INVENTION

The present invention relates generally to multi-processor systems, and more particularly to maintaining memory coherency within multi-processor systems.

BACKGROUND OF THE INVENTION

A network device, such as a switch or router, may include a network processor that facilitates transmission of data, such as cells or frames, into and out of the network device. Such a network processor may store information in memory, in one or more control structures (e.g., control blocks), corresponding to data transmitted to the network processor.

A data coherency problem may arise within a network processor when multiple components of the network processor attempt to modify the same control structure at nearly the same instant in time or during an overlapping time period. For example, one component of a network processor may attempt to modify a control structure in a memory while another component is modifying the same control structure in the memory.

Some network processors use a bus protocol that prevents a component from modifying a control structure (e.g., by locking access to the control structure) while another component that is coupled to the same bus is modifying the control structure. Alternatively, some network processors use a bus protocol that employs snooping methods to determine whether a component that is coupled to a bus is modifying the control structure. If a component is modifying the control structure, other components must wait until the component has completed its modifications. However, this approach only works on certain bus protocols. While effective, bus protocol and/or snooping techniques tend to be complex, process intensive and expensive to implement, and may be unavailable (e.g., in an existing processor that lacks such features). Accordingly a need exists for improved methods and apparatus for maintaining data coherency in a network processor.

SUMMARY OF THE INVENTION

In a first aspect of the invention, a method for maintaining control structure coherency is provided. The method includes the steps of (1) writing a pointer to a control structure in a hardware update list while one or more portions of the control structure are accessed by hardware during a hardware update operation; and (2) delaying a software access to one or more portions of the control structure during a software update operation while the pointer to the control structure is on the hardware update list.

In a second aspect of the invention, an apparatus is provided that includes hardware update logic adapted to couple to a memory controller of a network processor and adapted to interact with at least one memory so as to (1) write a pointer to a control structure stored in the at least one memory in a hardware update list while one or more portions of the control structure are accessed by the hardware update logic during a hardware update operation; and (2) delay a software access to one or more portions of the control structure during a software update operation while the pointer to the control structure is on the hardware update list.

In a third aspect of the invention, a network processor system is provided. The network processor system includes at least one memory adapted to store a plurality of control structures and a network processor. The network process includes a memory controller coupled to the at least one memory and hardware update logic coupled to the memory controller. The hardware update logic is adapted to interact with the at least one memory so as to (1) write a pointer to a control structure in a hardware update list while one or more portions of the control structure are accessed by the hardware update logic during a hardware update operation; and (2) delay a software access to one or more portions of the control structure during a software update operation while the pointer to the control structure is on the hardware update list.

Numerous other aspects are provided, as are computer program products in accordance with these and other aspects of the invention. Each computer program product described herein may be carried by a medium readable by a computer (e.g., a carrier wave signal, a floppy disc, a compact disc, a DVD, a hard drive, a random access memory, etc.).

Other features and aspects of the present invention will become more fully apparent from the following detailed description, the appended claims and the accompanying drawings.

DETAILED DESCRIPTION

A network processor typically performs such functions as packet classification, packet modification, queue management and/or packet forwarding. For example, packet classification may include identifying a packet based on known characteristics (e.g., address or protocol). Packet modification may include modifying a packet to comply with a protocol (e.g., updating the header information of a TCP/IP protocol packet). Queue management may include queuing, de-queuing and scheduling of packets to be used by an application. Packet forwarding may include forwarding or routing a packet, such as a TCP/IP protocol packet, to the packet's appropriate destination address.

While performing packet classification, packet modification, queue management and/or packet forwarding, the network processor may modify one or more control structures that are stored in memory (e.g., control blocks) and that correspond to data (e.g. frames or cells) received by the network processor (e.g., to update address/routing information, checksum information, etc.). The network processor may modify a control structure stored in a memory using multiple components. For example, the network processor may use software (e.g., instructions executed by a processor) or hardware (e.g., a logic device) to modify the control structure.

As stated above, a problem may arise when two different components need to modify the same control structure at nearly the same time. Absent a data coherency scheme, the resulting control structure stored in memory may not accurately reflect the modifications made by the two components. For example, hardware of a network processor may read an entire control block from the memory, modify certain fields of the control block and write the entire control block back to the memory. While the hardware is modifying the control block, software of the network processor may modify one or more fields of the control block before the hardware writes its modified control block back to the memory. Consequently, the control block stored in memory will include the changes made by the software. However, once the hardware has completed modifying fields of the control block, and writes the entire control block back to the memory, the fields of the control block that were modified by the software may be lost/overwritten. Accordingly, the control block stored in the memory may be incoherent with the cell or frame to which it corresponds. Methods and apparatus for ensuring control block coherency in these and other situations are described below with reference to FIGS. 1–4.

Figure 1:
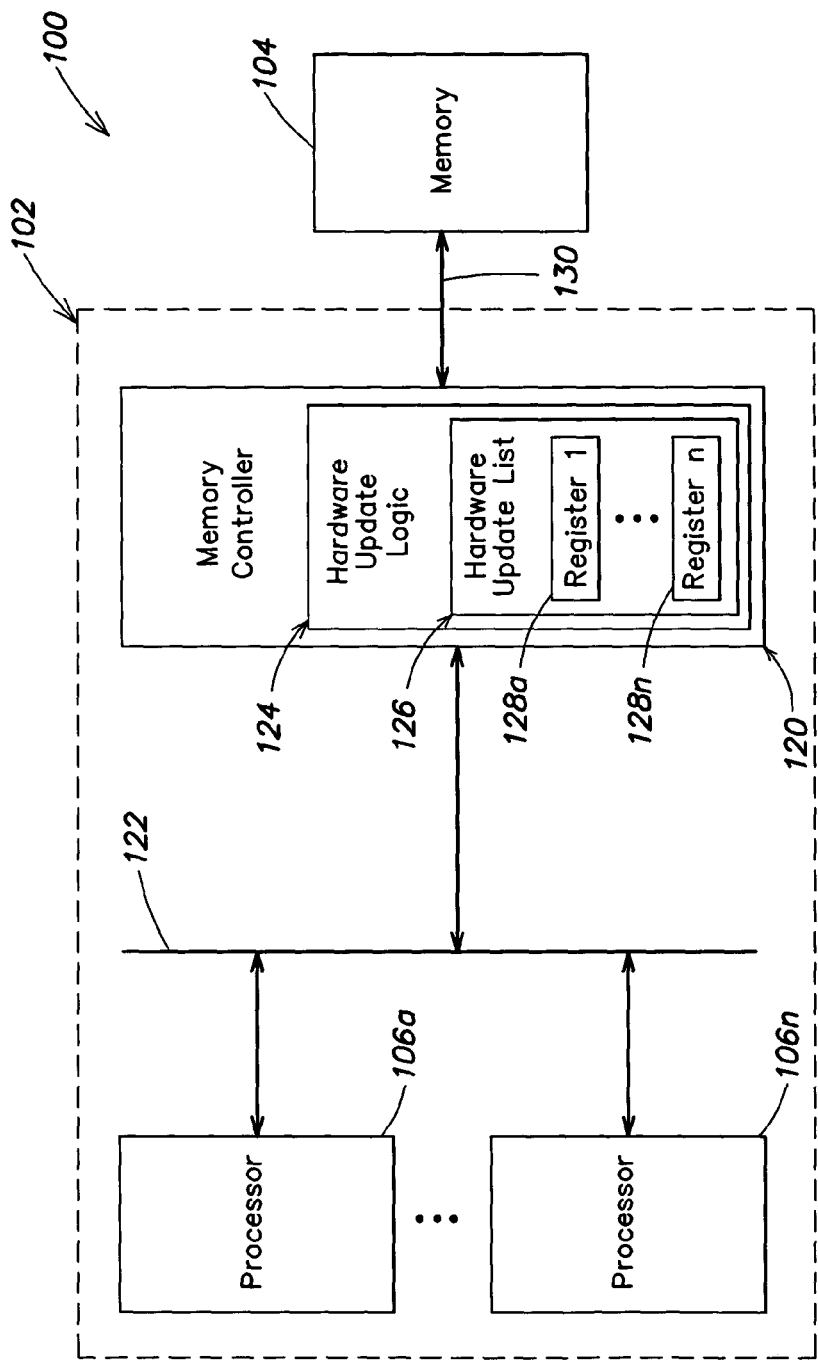
FIG. 1 is an exemplary network processor system in which the present methods and apparatus may be implemented.

FIG. 1 is an exemplary network processor system 100 in which the present methods and apparatus may be implemented. The network processor system 100 may include a network processor 102 coupled to a memory 104, such as a DRAM or other similar memory. In one embodiment, the memory 104 may be external to (e.g., off chip from) the network processor 102.

The network processor 102 may include one or more processors 106a–n, each of which may include a memory (e.g., cache) (not shown). Each processor 106a–n may be coupled to a memory controller 120 via a bus 122 (e.g., a processor local bus). Each 106a–n processor may store and create instructions that cause the processor to modify one or more control structures, such as a control block, in the memory 104 via the bus 122 and memory controller 120.

The memory controller 120 may be coupled to the memory 104 and allow components of the network processor 102 to communicate with the memory 104. The memory controller 120 also may be coupled to and/or may include hardware update logic 124 (e.g., locking logic). The hardware update logic 124 may include a plurality of registers 128a–n. In one embodiment the hardware update logic includes eight registers, although more or fewer may be employed. The hardware update logic 128a–n may include any suitable combination of logic, registers, memory or the like, and in at least one embodiment may comprise an application specific integrated circuit (ASIC).

Figure 2:
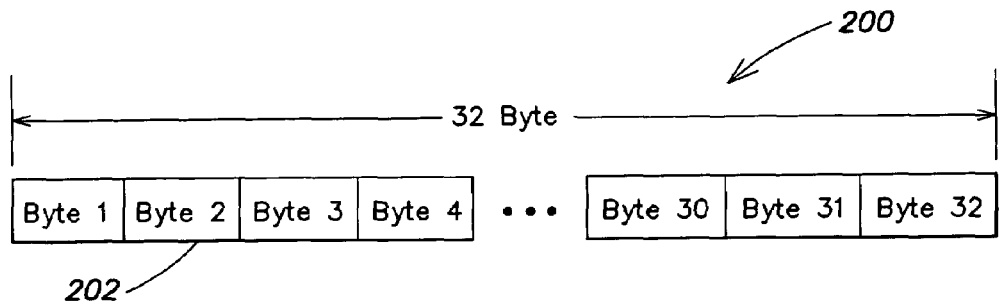
FIG. 2 is a block diagram of an exemplary control block that may be stored in a memory of the network processor system of FIG. 1.

FIG. 2 is a block diagram of an exemplary control block 200 that may be stored in the memory 104. The control block 200 includes a plurality of fields that contain information corresponding to a cell or frame received in the network processor 102. In one embodiment, each control block 200 may include thirty-two one-byte fields of data and therefore, be thirty-two bytes in size. Other control block sizes may be used. One or more portions or fields (e.g., the second byte 202) of each control block 200 may be accessed by software (e.g., by instructions executed by a processor 106a–n) or by hardware (e.g., by the hardware update logic 124). In at least one embodiment, when a control block is accessed by software during a software update operation, one or more portions or fields of the control block may be read from the memory 104, modified, and written back to the memory 104 using software. Similarly, when a control block 200 is accessed by hardware (e.g., via the hardware update logic 124) during a hardware update operation, one or more portions or fields of the control block may be read from the memory, modified and written to the memory using hardware.

The operation of the network processor system 100 is now described with reference to FIGS. 1–2, and with reference to FIG. 3, which illustrates an exemplary method 300 of performing a hardware update operation in the network processor system 100 while maintaining control block coherency. More specifically, FIG. 3 illustrates the steps performed by the network processor system 100 to ensure control block coherency when hardware is used to access one or more portions of a control block during a hardware update operation.

Figure 3:
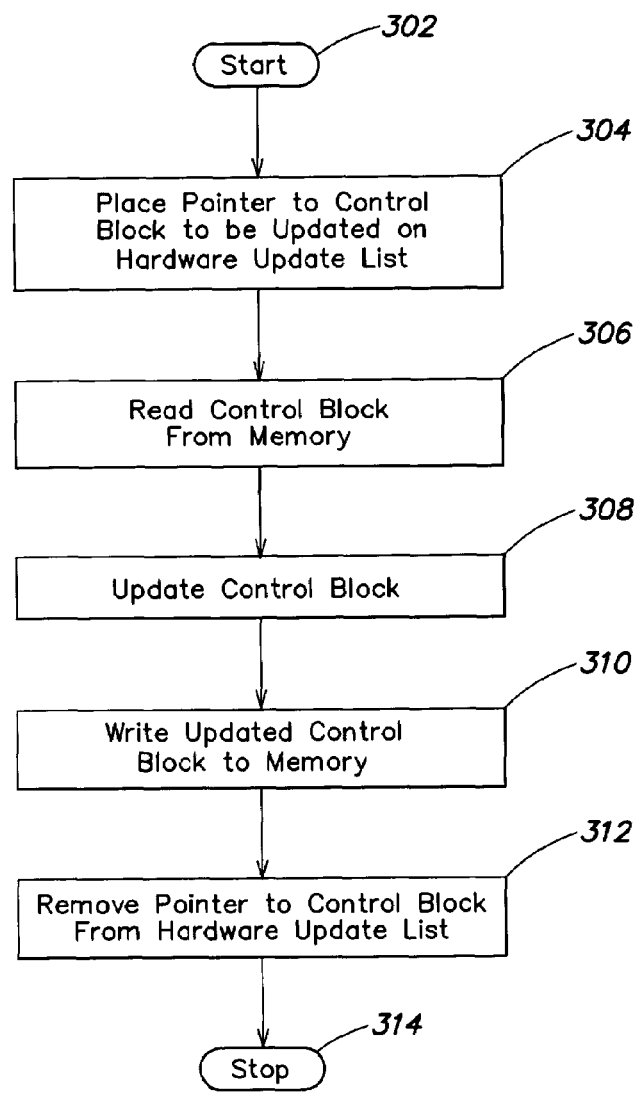
FIG. 3 illustrates an exemplary method of performing a hardware update operation in the network processor system of FIG. 1 while maintaining control block coherency.

With reference to FIG. 3, in step 302, the method 300 begins. In step 304, a pointer to a control block to be updated is placed on a hardware update list. For example, when the hardware update logic 124 is to access one or more portions of the control block 200, information representing at least a portion of an address of the control block 200 may be placed on the hardware update list 126 (e.g., by storing the address information in one of the registers 128a–n). As will be described in detail below, entries in the hardware update list 126 are used to determine whether a software access to a control block will be allowed.

In step 306, one or more portions (e.g., one or more bytes of data) of the control block are read from the memory 104. More specifically, when the hardware update logic 124 performs a hardware update operation, the hardware update logic 124 may send a request for access to one or more portions of a control block to the memory controller 120. In response to that request, the memory controller 120 may retrieve the specified one or more portions of the control block from the memory 104 and provide the one or more portions of the control block to the hardware update logic 124.

In step 308, one or more portions of the control block may be updated. For example, one or more bytes or fields of the control block 200 may be updated by the hardware update logic 124. For example, as mentioned above, the network processor system 100 may perform packet modification on a received frame or cell by modifying the control structure (e.g., control block) that corresponds to the frame or cell. For instance, during packet modification, the checksum field of the control block that corresponds to the received cell or frame may be updated or modified by the hardware update logic 124.

Following the updating of one or more portions of the control block using the hardware update logic 124, in step 310, the one or more updated portions of the control block are written back to the memory 104. For example, the hardware update logic 124 may send a request to the memory controller 120 to write the one or more updated portions of the control block back to the memory 104.

The read and write steps, step 306 and step 310, respectively, may be performed on one or more portions of the control block 200 or on the entire (e.g., all portions of the) control block. When all portions of a control block are read or written, the fields of the control block that were modified by the hardware update logic 124 will reflect the modifications made to the control block by the hardware update logic 124 and the fields that were not modified by the hardware update logic 124 will reflect the values the fields had at the time the control block was read from the memory 104. Because the hardware update logic 124 typically modifies a plurality of portions of a control block, reading the entire control block from the memory 104, modifying the plurality of portions of the control block, and writing the entire control block to the memory 104 is a more efficient use of the bus 130 between the memory controller 120 and the memory 104 than reading a portion of a control block from the memory 104, updating the portion of the control block, and writing the updated control block to the memory 104 for each portion of the control block that is to be updated by the hardware update logic 124. In contrast, software update operations typically modify only one or a few portions (fields) of a control block and may be more efficiently performed by only reading and writing back those portions of a control block that are to be modified during a software update. As will be described further below with reference to FIG. 4, use of the hardware update list 126 may ensure data coherency even when a software update is attempted on a control block that is being modified by the hardware update logic 124.

In step 312, the pointer to the control block that was updated in step 308 is removed from the hardware update list 126. More specifically, after a read-modify-write is performed on the control block, the pointer to the control block is removed from the register 128*a–n* in which the pointer was stored. In step 314, the method of FIG. 3 ends.

Figure 4:
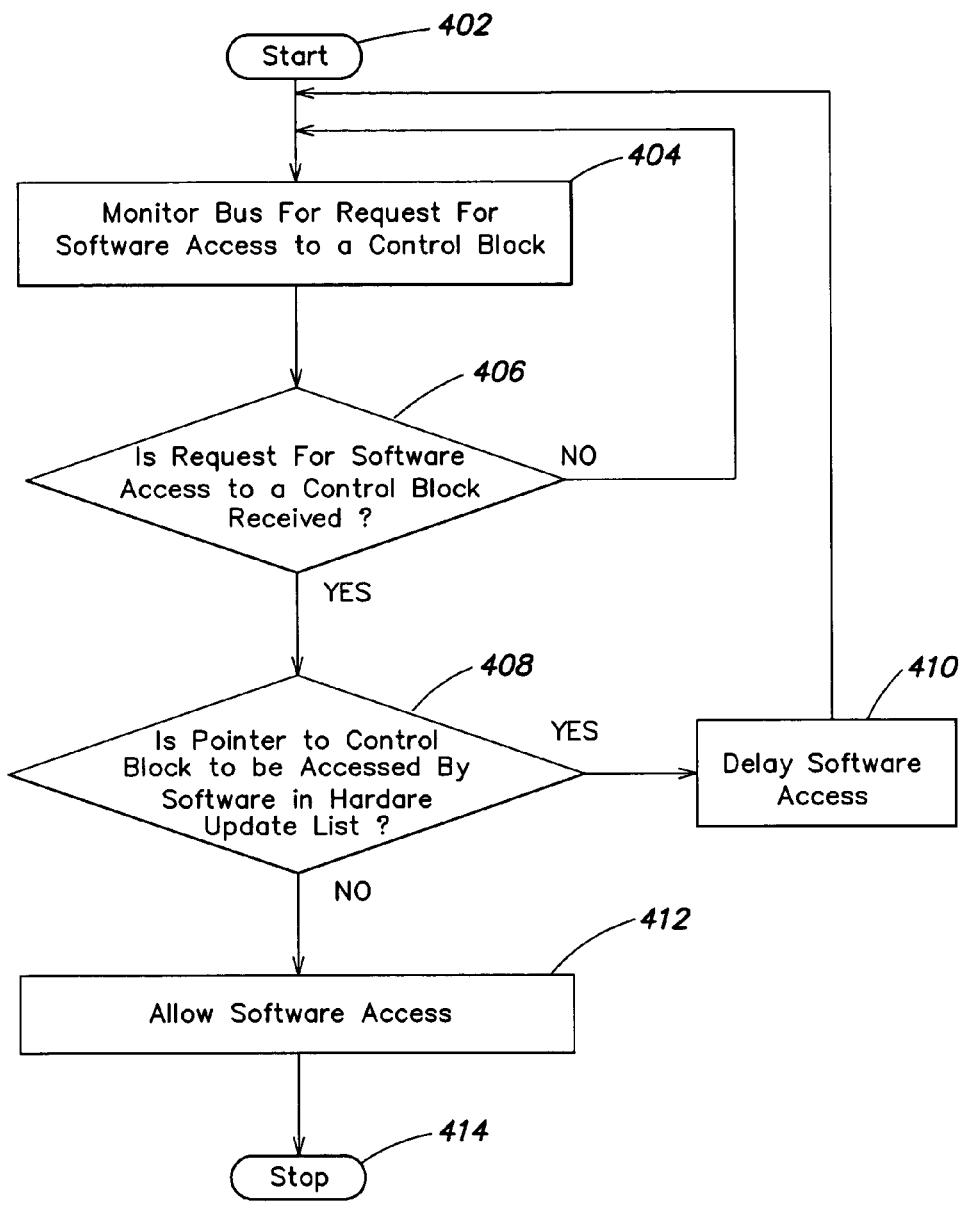
FIG. 4 illustrates an exemplary method of performing a software update operation in a network processor system of FIG. 1 that ensures control block coherency.

FIG. 4 illustrates an exemplary method 400 of performing the software update operation in a network processor system 100 that ensure control block coherency. More specifically, FIG. 4 illustrates the steps performed by the network processor system 100 that ensure control block coherency when software is used to access one or more portions of a control block during a software update operation.

With reference to FIG. 4, in step 402, the method 400 begins. In step 404, the bus 122 is monitored for a request for software access to a control block. For example, the memory controller 120 and/or the hardware update logic 124 may monitor the processor local bus 122 for control signals and/or an address from one of the processors 106*a–n*. For example, the hardware update logic 124 may employ the memory controller 120 to detect control signals and/or addresses on the bus. The control signals and/or the address may indicate the command that is to be performed and/or the control block on which the command is to be performed.

Software access to a control block may include at least one of reading the one or more operations of the control block from the memory, modifying one or more portions of the control block. For example, a processor 106*a–n* of the network processor system 100 may require access to one or more portions of a control block that corresponds to a received frame or cell when a network connection (e.g., a channel) from which the network processor receives data is no longer active. In such a case, one or more bits of a field of the control block that corresponds to the received frame or cell may be modified by the processor to disable the channel. When only a few bits of a portion/field of a control block are to be modified, it is generally more efficient to (1) read only the portion/field of the control block that is to be modified from the memory 104; (2) modify the appropriate bits of the portion/field of the control block; and (3) write the modified portion/field of the control block back to the memory 104 rather than reading and writing the entire control block from/to the memory 104.

In step 406, it is determined whether a request for software access to one or more portions of a control block is received. For example, it may be determined whether the memory controller 120 has received a request for software access (e.g., a request to write) to a portion (e.g., a byte) of the control block. If a request for software access to one or more portions of a control block has not been received, step 404 is repeated. For example, if the memory controller 120 does not receive a request to write to a byte of a control block, the memory controller 120 may continue to monitor the bus 122 for a request for software access to a control block (e.g., from a processor 106*a–n*). Alternatively, if a request for software access to a control block is received, step 408 is performed.

In step 408, the hardware update list 126 is examined to determine if the list includes a pointer to the control block for which software access was requested. For example, when the memory controller 120 receives a request to write to a control block from one of the processors 106*a–n*, the memory controller 120 may scan through each entry in the registers 128*a–n* to determine if the address of the control block (or a portion of the address of the control block) is stored in one of the registers 128*a–n*. If an entry in the hardware update list 126 includes a pointer to the control block for which software access is requested, in step 410, software access to the control block is delayed. For example, the memory controller 120 may be employed by the hardware update logic 124 to reject access to the bus 122 for the processor 106*a–n* requesting software access to the control block. In such an embodiment, the processor 106*a–n* would be required to send another request for software access to the control block (e.g., the processor 106*a–n* may include software and/or hardware that automatically sends additional requests until access is granted). Alternatively, the hardware update logic 124 may employ the memory controller 120 to grant the software access request (e.g., by an appropriate control signal to one of the processors 106*a–n*) and merely delay and/or queue the software access request until the hardware update operation is complete.

If it is determined that the hardware update list 126 does not include the pointer to the control block that is to be accessed by software, step 412 is performed. That is software access to the control block is allowed. For example, the memory controller 120 may allow the requesting processor 106*a–n* to access the bus 122 and the control block. In step 414, the method of FIG. 4 ends.

As shown in FIG. 3, a pointer to a control block is only included in the hardware update list 126 while hardware (e.g., the hardware update logic 124) is reading, updating, writing or otherwise employing the control block during a hardware update operation. Therefore, if the pointer to the control block is not in the hardware update list 126, the hardware update logic 124 is not employing the control block and a software access to the control block may be allowed with no risk of software update being overwritten by a hardware update operation.

By performing the methods of FIGS. 3 and 4, the network processor system 100 may ensure control block coherency while allowing one or more components of the network processor 102 to read, modify, and/or write to the same control structure at nearly the same time.

The foregoing description discloses only exemplary embodiments of the invention. Modifications of the above disclosed apparatus and method which fall within the scope of the invention will be readily apparent to those of ordinary skill in the art. For instance, although FIG. 3 illustrates an exemplary method of performing a hardware update operation in which a pointer to a control block is placed on the hardware update list 126 before the control block is read from the memory 104, it will be understood that the pointer to the control block may be placed on the hardware update list 126 after the control block is read from the memory 104.

Although the exemplary network processor system 100 shown in FIG. 1 includes a network processor 102 with two processors, the network processor 102 may include a single processor or more than two processors. Further, although the exemplary network processor system 100 of FIG. 1 illustrates a memory controller 120 that includes the hardware update logic 124, the hardware update logic 124 may be external to the memory controller 120. Likewise, the registers 128*a–n* may be replaced by an on-chip memory.

One or more of the steps of the process 300 of FIG. 3 or the process 400 of FIG. 4 may be implemented in computer program code (e.g., within the memory controller 120, one or more of the processors 106*a–n*, etc.) as one or more computer program products.

Accordingly, while the present invention has been disclosed in connection with exemplary embodiments thereof, it should be understood that other embodiments may fall within the spirit and scope of the invention, as defined by the following claims.

The invention claimed is:

1. A method for maintaining control structure coherency comprising:
   writing a pointer to a control structure in a hardware update list while one or more portions of the control structure are accessed by a logic device during a hardware update operation; and
   delaying instructions executed by a processor from accessing the one or more portions of the control structure during a software update operation while the pointer to the control structure is on the hardware update list.

2. The method of claim 1 further comprising removing the pointer to the control structure from the hardware update list after the one or more portions of the control structure accessed by the logic device during the hardware update operation are no longer accessed by the logic device.

3. The method of claim 1 wherein writing the pointer to the control structure in the hardware update list while one or more portions of the control structure are accessed by the logic device includes writing the pointer to the control structure in the hardware update list while all portions of the control structure are accessed by the logic device during the hardware update operation.

4. The method of claim 1 wherein the software update operation includes updating a field of the control structure using instructions executed by the processor.

5. The method of claim 1 wherein the pointer represents at least a portion of an address of the control structure.

6. The method of claim 1 wherein the hardware update list is stored in a logic device.

7. The method of claim 6 wherein the hardware update list is stored in at least one of memory and registers.

8. The method of claim 1 wherein the hardware update list includes a plurality of entries.

9. The method of claim 1 wherein the control Structure includes a control block.

10. The method of claim 9 wherein a control block includes a plurality of bytes of data.

11. The method of claim 9 wherein the control block includes information based on a cell or frame received by a network processor.

12. The method of claim 9 wherein the one or more portions of the control structure include one or more bytes of the control block.

13. The method of claim 1 wherein writing the pointer to the control structure in the hardware update list while one or more portions of the control structure are accessed by the logic device during the hardware update operation includes writing the pointer to the control structure in the hardware update list while one or more pointers of the control structure are read from a memory, modified, and written back to the memory by the logic device during the hardware operation.

14. The method of claim 1 wherein delaying the instructions executed by the processor from accessing the one or more portions of the control structure includes monitoring a bus for at least one of a control signal and an address.

15. The method of claim 14 wherein delaying the instructions executed by the processor from accessing the one or more portions of the control structure includes rejecting the instructions executed by the processor at the bus while the pointer to the control structure is on the hardware update list.

16. The method of claim 14 wherein delaying the instructions executed by the processor from accessing the one or more portions of the control structure includes:
   granting a request for the instructions executed by the processor to access the one or more portions of the control structure; and
   delaying the instructions executed by the processor while the pointer to the control structure is on the hardware update list.

17. The method of claim 1 wherein delaying the instructions executed by the processor from accessing the one or more portions of the control structure while the pointer to the control structure is on the hardware update list includes delaying at least one of a read, a modify and a write operation performed by software on the one or more portions of the control structure while the pointer to the control structure is on the hardware update list.

18. An apparatus comprising:
   a hardware update logic device adapted to couple to a memory controller of a network processor and adapted to interact with an at least one memory so as to:
   write a pointer to a control structure stored in the at least one memory in a hardware update list while one or more portions of the control structure are accessed by the hardware update logic device during a hardware update operation; and
   delay instructions executed by the processor from accessing the one or more portions of the control structure during a software update operation while the pointer to the control structure is on the hardware update list.

19. The apparatus of claim 18 wherein the hardware update logic device is further adapted to remove the pointer to the control structure from the hardware update list after the one or more portions of the control structure accessed by the hardware update logic device during the hardware update operation are no longer accessed by the hardware update logic device.

20. The apparatus of claim 18 wherein the hardware update logic device is adapted to detect the instructions executed by the processor by employing the memory controller to monitor at least one of a control signal and an address on a bus.

21. The apparatus of claim 19 wherein the hardware update logic device is adapted to delay the instructions executed by the processor from accessing the one or more portions of the control structure by employing the memory controller to reject instructions executed by the processor at the bus while the pointer to the control structure is on the hardware update list.

22. The apparatus of claim 19 wherein the hardware update logic device is adapted to delay the instructions executed by the processor from accessing the one or more portions of the control structure by employing the memory controller to:

grant a request for the instructions executed by the processor for accessing the one or more portions of the control structure; and delay the instructions executed by the processor while the pointer to the control structure is on the hardware update list.

23. A network processor system comprising:
at least one memory adapted to store a plurality of control structures;
a network processor comprising:
   a memory controller coupled to the at least one memory;
   a hardware update logic device coupled to the memory controller and adapted to interact with the at least one memory so as to:
     write a pointer to a control structure in a hardware update list while one or more portions of the control structure are accessed by the hardware update logic device during a hardware update operation; and
     delay instructions executed by a processor from accessing the one or more portions of the control structure during a software update operation while the pointer to the control structure is on the hardware update list.

24. The network processor system of claim 23 wherein the hardware update logic device is further adapted to remove the pointer to the control structure from the hardware update list after the one or more portions of the control structure accessed by the hardware update logic device during the hardware update operation are no longer accessed by the hardware.

25. The network processor system of claim 23 wherein the hardware update logic is adapted to detect the instructions executed by a processor by employing the memory controller to monitor at least one of a control signal and an address on a bus.

26. The network processor system of claim 23 wherein the memory controller includes the hardware update logic device.

27. The network processor system of claim 26 wherein the hardware update logic device includes on-chip memory.

28. The network processor system of claim 23 further comprising a plurality of processors coupled to the memory controller using an internal bus.

29. The network processor system of claim 23 wherein the at least one memory includes a DRAM.

* * * * *